United States Patent [19]
Lewis et al.

[11] Patent Number: 5,673,331
[45] Date of Patent: Sep. 30, 1997

[54] METHOD AND APPARATUS FOR READING METERS FROM A VIDEO IMAGE

[75] Inventors: Trevor J. Lewis, Irwin; Jeffrey J. Ferguson, North Huntingdon, both of Pa.

[73] Assignee: United States Department of Energy, Washington, D.C.

[21] Appl. No.: 462,339

[22] Filed: Jun. 3, 1995

[51] Int. Cl.[6] .................................................. G06K 9/00
[52] U.S. Cl. .................................. 382/100; 340/870.02
[58] Field of Search .......................... 382/100, 209, 382/291; 340/870.02, 870.29, 688; 364/464.04; 348/160

[56] References Cited

U.S. PATENT DOCUMENTS

| | | | |
|---|---|---|---|
| 4,680,704 | 7/1987 | Konicek et al. | 364/525 |
| 4,831,873 | 5/1989 | Charbonneau et al. | 73/168 |
| 4,851,903 | 7/1989 | Ikeda et al. | 358/101 |
| 4,869,102 | 9/1989 | Hale et al. | 73/168 |
| 5,013,154 | 5/1991 | Kominsky | 356/375 |
| 5,056,046 | 10/1991 | Mutchler et al. | 364/551.01 |
| 5,067,161 | 11/1991 | Mikami et al. | 382/1 |
| 5,077,806 | 12/1991 | Peters et al. | 382/8 |
| 5,125,037 | 6/1992 | Lehtonen et al. | 382/8 |
| 5,263,098 | 11/1993 | Horikami | 382/48 |
| 5,559,894 | 9/1996 | Lubliner et al. | 382/100 |

*Primary Examiner*—Andrew Johns
*Attorney, Agent, or Firm*—Virginia B. Caress; William R. Moser; Paul A. Gottlieb

[57] ABSTRACT

A method and system to enable acquisition of data about an environment from one or more meters using video images. One or more meters are imaged by a video camera and the video signal is digitized. Then, each region of the digital image which corresponds to the indicator of the meter is calibrated and the video signal is analyzed to determine the value indicated by each meter indicator. Finally, from the value indicated by each meter indicator in the calibrated region, a meter reading is generated. The method and system offer the advantages of automatic data collection in a relatively non-intrusive manner without making any complicated or expensive electronic connections, and without requiring intensive manpower.

14 Claims, 1 Drawing Sheet

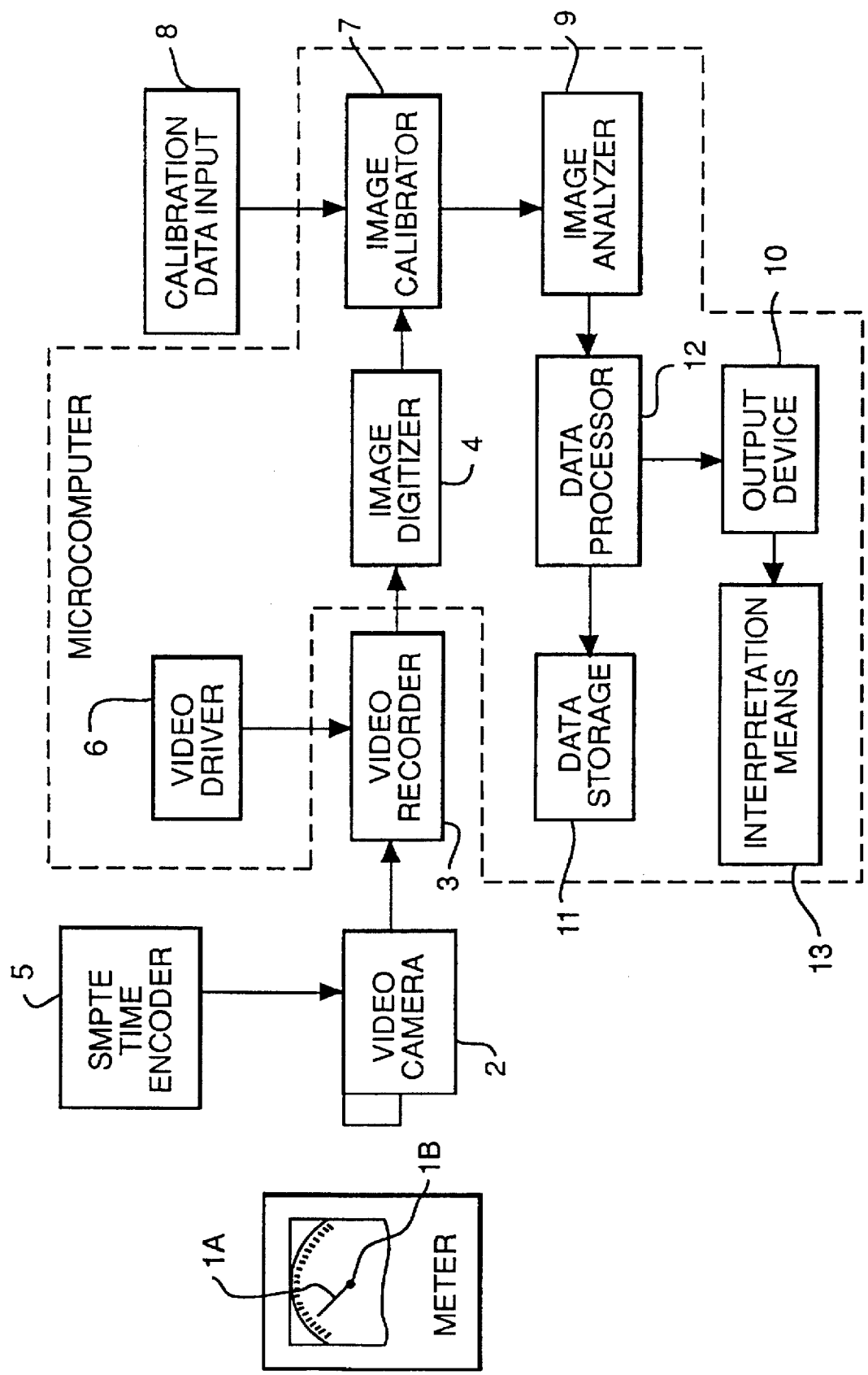

METHOD AND APPARATUS FOR READING METERS FROM A VIDEO IMAGE

BACKGROUND OF THE INVENTION

1. Field of the Invention

The present invention relates to methods and apparatus for automatic meter reading employing a video camera. More particularly, the present invention relates to an automated method and apparatus for data acquisition from meters which operate via a display means.

2. The Prior Art

Many industrial facilities still employ devices which monitor the parameters of the environment in the facility and generate an output on one or more meters. These meters are typically read manually by a human operator assigned to monitor the meter readings.

In many instances, it is desirable to compile data regarding the values of one or more parameters measured by such meters as a function of time. Since these meters must be read manually, significant manpower must be expended in order to compile such data. While it is possible to install electronic data system inputs for all of the required parameters, such an installation would require considerable time, effort and expense.

Accordingly, it is desirable to find a less expensive and less intrusive method for compiling data from one or more meters for a given environment. One way to compile data is to videotape the meters for a period of time. Monitoring parameters of a system using a video camera is known from, for example, U.S. Pat. No. 5,056,046 which discloses an apparatus and method for acquiring data from pneumatically operated valves. The method and apparatus of this patent employ a video camera to monitor the position of the valve stem associated with a stem valve. The video monitor is connected to a computer terminal which is manned by a technician whose responsibility is to monitor the condition of the valve by watching the video thereof. Thus, the only benefit obtained by this device is that the condition of the valve can be monitored from a remote location.

U.S. Pat. No. 5,077,806 discloses a machine vision analysis apparatus and method for automatically checking objects for specified characteristics. The device employs a video camera for providing an analog video input signal and a digital to analog converter for converting a digital threshold grey level into an analog threshold corresponding to the digital threshold level. In this manner, an essentially black and white digital image is produced whereby a microprocessor can count the number of black pixels associated with the digitized image and compare that to the expected count results in order to recognize specified characteristics within the view of the video camera. This method and apparatus are primarily designed for the examination of biological samples where an image density within a particular range is employed for recognition of the specified object. This method is not well-suited for measuring a moving image such as the angular position of a metering device since the video image is not saved in digital form and many potential locations of the meter may have to be examined before a result can be determined.

Another image recognition device is disclosed in U.S. Pat. No. 5,067,161 where a visual recognition device is employed to recognize an object from the video signal of a video camera. This visual recognition device converts the video signals to a two-valued input pattern and compares the input pattern with a standard pattern to recognize the object. The scanning method employed by this device is optimized for the location for the center of gravity of a known pattern on a real-time basis with respect to the video signal. This method has the advantage of great speed and is most effective when the object to be located is a known shape on a clean background. However, the device requires expensive, specially designed hardware to monitor the video signal and the hardware must be duplicated for each object to be recognized in the subject video image. Further, the method appears to be limited to a rectangular search area since more complex shapes may require more computational power than is available on a real-time basis. Finally, since this method only recognizes a singular input pattern relative to a predetermined standard pattern, it may pose problems in applications involving a meter pointer since a meter pointer may overlap meter scale markings or image defects which could be erroneously perceived as part of the pointer using this image recognition method. This could lead to calculation of an incorrect location or orientation of the object, for example.

Accordingly, there is a need in the art for an automated data acquisition method for acquiring and compiling data from one or more meters as a function of time.

SUMMARY OF THE INVENTION

Thus, it is the primary object of the present invention to provide a fully automated means for acquiring data from one or more existing metering devices which do not have electronic data acquisition system inputs.

It is a still further object of the present invention to provide an automatic data acquisition method which can acquire data from existing meters without employing a significant amount of manpower.

It is a still further object of the present invention to provide an automated data acquisition method and apparatus which allows an unattended computer to acquire and interpret a continuous series of video images of metered devices and display or record the meter readings as a function of time.

In a first aspect, the present invention relates to a system for acquiring data about an environment from one or more meters which employ indicators that respond to fluctuations of one or more measurable parameters of the environment. The system includes a camera means positioned to generate a video signal of at least one meter, data interface means to digitize the video signal from the camera means, calibration means to calibrate each region of the digitized video signal which corresponds to the indicator of a meter and analysis means to determine the reading of each meter. This system can be fully automated such that an unattended computer connected to a video camera can perform all of the required functions for data acquisition, interpretation and storage.

The present invention also relates to a method of acquiring data about an environment from one or more meters employing the above-described apparatus. The method includes the steps of positioning a video camera such that it generates a video signal of one or more meters, converting the video signal to a digital representation, calibrating each region of the digital representation which corresponds to the indicator of a meter, and generating a meter reading. Again, this method can be fully automated such that an unattended computer equipped with a video feed from a video camera can perform the functions of data acquisition, interpretation and storage.

By employing the apparatus and method of the present invention, one can obtain large quantities of data about a given environment without the expenditure of significant manpower, without installing expensive data acquisition apparatus and in a relatively non-intrusive manner.

These and other objects of the present invention will be apparent from the description which follows.

BRIEF DESCRIPTION OF THE DRAWINGS

The single figure of the drawings is a schematic representation of a system in accordance with a preferred embodiment of the present invention for use in acquiring data from one or more metering apparatus.

DETAILED DESCRIPTION OF THE PREFERRED EMBODIMENTS

The system of the present invention is schematically represented in the single figure of the drawings. More particularly, the drawings show a meter 1 of a type which generally does not include an electronic data acquisition system input. Typically, such meters will be of the type which employ indicators that move relative to a calibrated scale in response to fluctuations of one or more measurable parameters of an environment, although the present invention can also be employed with meters having a digital readout. The meter 1 illustrated employs a radial pointer 1a affixed to a central pivot point 1b. Illustrated radial pointer 1a sweeps an annular area in response to fluctuations of a parameter of the environment.

In the system of the present invention, a video camera 2 is positioned such that meter 1 is within the video image generated by the video camera 2. It is possible, when several meters corresponding to meter 1 are located in close proximity to one another, to acquire an image including several meters 1 with a single video camera 2. Any standard video camera may be employed and which type of video camera is preferred will depend partially upon whether the video image will be recorded onto a video recording device or whether the video signal will be fed directly to the image digitizer. One advantage of videotaping the video image is that data gathering can be performed at a varying location or time with respect to the data analysis phase of the effort. In this manner, several different video cameras can be set up throughout a facility to monitor different meters and the data collection and interpretation can be performed in a single central location employing the video images from each of the video cameras corresponding to camera 2.

A video recorder 3 connected to the output of camera 2 is an optional component of the present system. More particularly, it is also possible to feed the signal from the video camera 2 directly to the image digitizer 4. In addition, it is possible to provide a combination video camera 2 and video recorder 3 in one device. The primary advantage of employing a video recorder 3 is that it increases the flexibility of the system of the present invention by allowing several video cameras at remote locations to acquire data which can then be transported in the form of video recordings to a central data gathering and processing location.

Another optional component of the system of the present invention is a time encoder 5 also connected to camera 2. The time encoder 5 can be employed to time-stamp each frame on the audio track in accordance with the ANSI-SMPTE 12M-1986 standard using commercially available SMPTE time encoding equipment. Such SMPTE time codes are readable by a wide range of commercial video equipment. However, any method of time marking would suffice for the application of the present system, provided that the time markings can be read by the playback equipment.

The time markings provided by time encoder 5 can be employed to provide a representation of the data acquired from meter 1 over time. In addition, the time encoding provides a convenient means for synchronizing the data acquired from several different meters relating to a single environment so that an overall representation of the environment can be formed from data acquired at several different data acquisition points.

A video driver 6 connected to video recorder 3 is another optional piece of equipment in the system of the present invention. The video driver 6 is employed to drive video recorder 3 in the image playback mode in order to allow image digitizer 4 to capture single frames of the video image from the recorded video. Such video drivers 6 are commercially available and can be attached, for example, to the serial port of a host microcomputer. One advantage of employing a video driver 6 is that it allows acquisition of data from particular video frames corresponding to particular time codes encoded by the time encoder 5. In this manner, data can be sampled over incremental time periods with extreme precision.

The image digitizer 4 is, in fact, frame capture hardware which may be driven by commercially available software. For the specific task of capturing video frames, a data translation DT-2851 high resolution frame grabber may be utilized. This is an adaptor card which may be installed in the expansion slot of a personal computer. There are numerous similar products available for PC-based video image capturing.

The image digitizer 4 typically captures a single frame from the video recording into the memory of a computer as a 512×512 array of pixels, with each pixel containing a value in the range of 0–255 representing the intensity of that pixel. The commercially available hardware can be employed to capture a series of several video frames from predetermined locations on the video tape or at predetermined time intervals.

The data acquisition system of the present invention also includes an image calibrator 7 which operates on a quantum of inputted calibration data, shown as a calibration data input 8. In practice, image calibrator 7 will generally be a software program on a computer and calibration data input 8 will be data inputted via the keyboard of the computer by an operator. Image calibrator 7 performs the functions of defining the required parameters for each meter appearing in the digitized image.

Thus, for a typical meter 1 as shown in the drawings, the following data would be inputted via calibration data input 8:

1. The horizontal coordinate of the needle pivot point 16 in pixels.
2. The vertical coordinate of the needle pivot point 16 in pixels.
3. The inner radius of an annulus containing the visible portion of the needle 1a.
4. The outer radius of an annulus containing the visible portion of the needle 1a.
5. The leftmost point of travel of the needle 1a within the annulus.
6. The rightmost point of travel of the needle 1a within the annulus.
7. The clipping level applied to the image.
8. The width of the needle template in degrees.
9. The required density of the needle within the template in order for the needle to be considered present by the image recognition mechanism.

Image calibrator 7 employs the horizontal and vertical coordinates of the needle pivot point 1b to fix the position for an annulus representing the meter scale which is then generated from the inner and outer radii and the left and rightmost travel points of the needle. Then, image calibrator 7 calibrates the annulus by employing the inputted minimum and maximum values associated with the leftmost point of travel of the needle 1a and the rightmost point of travel of the needle 1a, respectively. Thus, for example, assuming an annulus sweeps a 60° area, wherein the leftmost point of travel of the needle corresponds to the value 0 and the rightmost point of travel of the needle corresponds to the value 100, the image calibrator will then divide the total difference between the two values by the number of degrees in the annulus to obtain a meter reading value of 1.67 per degree of the annulus. In this manner, a meter reading can later be calculated from the position of the needle 1a in degrees.

Finally, the image calibrator creates a needle template on the basis of the clipping level, width of needle template and required density of the needle 1a within the template as inputted via the calibration data input 8. More particularly, the clipping level is a value between 0 and 255 which determines the pixel intensity above which pixels will be considered white. All other pixels will be considered black. The clipping level is used to convert grey-scale images into a high contrast, black- and white-image to simplify the needle location method.

The needle template is then created by employing the width of the needle 1a in degrees which has been inputted, and the required density of the needle within the template in order for the needle to be considered present. Generally, it is preferred to create a needle template which is thinner than the needle 1a but thicker than any potentially interfering images such as calibration scales appearing on the meter in the video image. In this manner, a high pixel density within the template can be employed in order to avoid false locations of the needle 1a since the template will, at some point, fall squarely within the needle and be substantially completely black.

The system of the present invention further includes an image analyzer 9 connected to the output of image calibrator 7. The primary function of image analyzer 9 is to locate the position of the needle 1a of the meter 1 in any-given digital frame representation. Thus, the typical image analyzer 9 will be the software in a computer which applies an algorithm for determining the needle position within the calibrated annulus based on the parameters provided by image calibrator 7. In practice, the needle template is moved through the defined annular region in a given search pattern and each pixel within the template is examined to determine the number of black pixels within the template. This number is then compared to the total number of pixels within the template to obtain a percentage of black pixels. If this percentage of black pixels is greater than or equal to the required density of the needle 1a within the template as inputted via the calibration data input 8, the needle is assumed to be within the template at that location. A simple, but rather time consuming search method is simply to search the annulus from left to right using the needle template.

Image analyzer 9 can be operated on several different video images employing the same inputted parameters from the calibration data input 8 and image calibrator 7. Further, the search procedure employed by image analyzer 9 can be optimized to minimize repetitive actions and maximize the likelihood of finding the needle at the first location scanned using any known methods for optimizing such search procedures. Such optimization would allow faster image interpretation without deviating from the principles of the present invention.

The accuracy of the search method can be further enhanced by searching all contiguous angles which showed a pixel density greater than or equal to the inputted density. The physical needle position is then assumed to be at the median angle of the range of contiguous angles. This enhancement allows designation of a template which is significantly smaller than the physical needle, thereby increasing the tolerance of the system to poor image quality.

In the case of a meter employing a digital readout as the meter indicator, the calibration means locates the seven rectangular zones (the segments) per digit in the digital readout and sets the criteria to determine if each segment is illuminated. The image analyzer then decodes the results into a digit.

In actual operation, at least one video tape from at least 11 different cameras has been transcribed using the system described above. With good image quality, the method finds all needle locations correctly within an estimated ±1° for more than 95% of the video frames examined. The failed frames appear to be caused by problems in the image capture hardware and not the needle detection method. Thus, it is expected that correct needle locations will be determinable within 1° for 100% of video frames when more reliable image capture hardware is employed.

The system of the present invention can locate several needles per second to thereby provide large quantities of highly reliable data in short time periods without employing a large amount of manpower.

The system also includes an output device 10 which provides an output of the meter reading as calculated from the position of the needle determined by image analyzer 9 relative to the calibrated meter scale as created by image calibrator 7. Such an output can be in any form such as a simple numerical value, a graph or chart, or a three-dimensional plan view of the meter reading.

The system also includes optional additional apparatus such as a data storage unit 11, a data processor 12 and an interpretation means 13. Data storage unit 11 may be used to store meter readings or other forms of the acquired data.

Data processor 12 can be employed to process meter readings obtained from image analyzer 9 into any suitable form for output such as charts, graphs or other visual or mathematical representations.

The interpretation means 13 can be employed to coordinate meter readings from several different meters using the time encoding associated with the images. In this manner, for example, an entire process can be monitored by setting up a series of remote video cameras and processing all of the data from these cameras.

Another optional feature which can be employed with the system of the present invention is a video camera with automatic iris control for situations with changing illumination. Changing illumination can also be compensated for by a so-called, "sliding threshold" algorithm which compares the lighting level from one frame to the next and adjusts the grey level threshold to maintain a constant number of pixels in the pointer area. Such an algorithm can maintain consistent performance even if ambient lighting levels change during the recording period.

The system has the advantages that all components are commercially available and no custom circuitry is required. Further, there is no interaction with, or connection—mechanical or electrical—to the subject instrumentation. Thus, the subject instrumentation need not be electrical and can be pneumatic, hydraulic or similar equipment.

Further, the instrumentation being monitored need not be operated, modified or calibrated in any special manner prior to the observation. The sole preparation of the measurement site is installation of one or more video cameras which can view the instrumentation. With the exception of the video camera, all equipment may be remote from the observation site. This may be important in critical operation areas, such as a small control room where intrusions must be minimized, or an area where due to the environment, it is impractical or undesirable to spend time performing connections or calibrations.

The system of the present invention may be employed to remotely collect data using individual video cameras, or to directly feed data into a processing system. Thus, the present system may be used for live, real-time monitoring of remote processes or processes which are otherwise unattended. Continuous video monitoring could eliminate the need for the presence of an operator by setting off an alarm when a particular indication moves outside of a predetermined range.

The present invention also relates to a method of acquiring data about an environment from one or more meters. The method may employ the illustrated system, including any number of the optional components mentioned therein.

In the method, a video camera is positioned such that it generates a video signal of one or more meters. The video signal is then converted to a digital representation by, for example, commercially available hardware for this purpose. Then, each region of the digital representation which corresponds to the scale of a meter is calibrated. As mentioned above, calibration will require some external information input regarding the meter which has been filmed.

The next step in the method is to determine the position of each meter indicator relative to each calibrated region and, finally, to generate a meter reading on the basis of the position of each meter indicator in the digital representation.

The calibration step of the method is carried out as described above. More particularly, the calibration step may include the steps of inputting certain parameters for each meter regarding the location of the region of the digital representation which corresponds to the scale of each meter, the physical characteristics of the representation of each meter indicator and the scale for the region of the digital representation corresponding to the scale of each meter. These parameters are then processed to locate the region of the digital representation corresponding to each meter scale and a template is created for each meter indicator. Finally, a value of each meter reading is associated with a given position of each meter indicator relative to the meter scale.

The method of the present invention may also comprise one or more optional steps including the steps of storing each meter reading generated by the method as well as generating an interpretation of one or more conditions of the environment from a plurality of time-synchronized meter readings. In the method of the present invention, time synchronization can be accomplished by associating a time reference signal with the video signal and retaining the time reference signal in association with the digital representation of the video signal. A means for synchronizing the meter readings from several different meters can be employed, which means uses the time reference signal to select meter readings corresponding to the same moment in time. In this manner, an accurate picture of an entire process can be developed using the method of the present invention.

The foregoing detailed description of the invention has been presented for the purposes of illustration and description only and is not to be construed as limiting the invention in any way. The scope of the invention is to be determined by the claims appended hereto.

What is claimed is:

1. A system for acquiring data about an environment from at least one meter which employs an indicator that changes in response to fluctuations of at least one measurable parameter of the environment, said system comprising:

a) camera means positioned relative to at least one meter including at least one indicator, for generating a video signal of said at least one meter;

b) means for associating a time reference signal with said video signal;

c) data interface means for digitizing the video signal generated by said camera means;

d) calibration means for calibrating each region of the digitized video signal which corresponds to the indicator of the at least one meter;

e) analysis means for determining the value indicated by said indicator; and f) output means for generating a meter reading from the value indicated by said meter indicator as determined by said analysis means.

2. A system for data acquisition as claimed in claim 1 which further comprises a storage means for storing each meter reading generated by said output means.

3. A system for data acquisition as claimed in claim 1 wherein said camera means generates at least one video signal of at least two different meters, said system further comprising means for synchronizing the meter readings from said output means on the basis of the time reference signal.

4. A system for data acquisition as claimed in claim 3 which further comprises means for generating an interpretation of at least one condition of the environment from at least two meter readings obtained from said output means.

5. A system as claimed in claim 1 wherein said calibration means comprises:

a) input means for receiving data regarding the calibration of the at least one meter;

b) means for defining each region of the video signal which corresponds to the indicator of the at least one meter; and c) processing means for calibrating each defined region of the video signal on the basis of the inputted data received by said input means.

6. A system as claimed in claim 5 wherein the at least one meter employs a radial pointer which sweeps a sweep area and the calibration means defines an annular region of the video signal which corresponds to the pointer sweep area.

7. A system as claimed in claim 5 wherein the at least one meter employs a digital readout and the calibration means defines the region of the video signal which corresponds to the digital readout.

8. A method of acquiring data about an environment from at least one meter which employs an indicator that varies in response to fluctuations of at least one measurable parameter of the environment, said method comprising the steps of:

a) positioning a video camera such that it generates a video signal of at least one meter which includes at least one indicator;

b) associating a time reference signal with the video signal;

c) converting the video signal to a digital representation;

d) retaining the time reference signal in association with the digital representation of the video signal;

e) calibrating at least one region of the digital representation which corresponds to the indicator of the at least one meter;

f) determining the value represented by the at least one meter indicator by analysis of the at least one calibrated region; and g) generating at least one meter reading on the basis of the value represented by the at least one meter indicator.

9. A method in accordance with claim 8 further comprising the step of storing the at least one meter reading.

10. A method in accordance with claim 8 wherein the method generates meter readings from at least two meters by employing at least one video camera to generate at least one video signal and further comprising a means for synchronizing the meter readings on the basis of the time reference signal associated with the digital representation of the at least one video signal.

11. A method in accordance with claim 10 further comprising the step of generating at least one interpretation of one or more conditions of the environment from the at least two synchronized meter readings.

12. A method in accordance with claim 8 wherein at least one meter employs a radial pointer which is fixed to a central pivot point and which sweeps a calibrated scale in response to fluctuations of a measurable parameter.

13. A method in accordance with claim 8 wherein said calibration step comprises the steps of:

a) inputting certain parameters for the at least one meter regarding the location of the region of the digital representation which corresponds to the indicator of the at least one meter, the physical characteristics of the representation of at least one meter indicator; and the scale for the region of the digital representation corresponding to the indicator of at least one meter;

b) processing the inputted parameters to locate the region of the digital representation corresponding to the at least one meter;

c) creating a template of the at least one meter indicator; and d) associating a meter reading with at least one meter indicator relative to the at least one corresponding calibrated region.

14. A method in accordance with claim 8 wherein the at least one meter employs a digital readout and the calibration step defines the region of the video signal which corresponds to the digital readout.

\* \* \* \* \*